(12) United States Patent
Michelon

(10) Patent No.: US 9,740,199 B2
(45) Date of Patent: *Aug. 22, 2017

(54) DEVICE FOR THE REMOTE CONTROL OF A MOTORIZED UNDERWATER SURFACE CLEANING APPARATUS AND APPARATUS THUS CONTROLLED

(71) Applicant: ZODIAC POOL CARE EUROPE, Paris (FR)

(72) Inventor: Thierry Michelon, Toulouse (FR)

(73) Assignee: ZODIAC POOL CARE EUROPE, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/009,310

(22) Filed: Jan. 28, 2016

(65) Prior Publication Data
US 2016/0170409 A1 Jun. 16, 2016

Related U.S. Application Data

(63) Continuation of application No. 13/662,708, filed on Oct. 29, 2012, now Pat. No. 9,250,626.
(Continued)

(30) Foreign Application Priority Data

Oct. 27, 2011 (FR) ...................... 11 03275

(51) Int. Cl.
*G05D 1/00* (2006.01)
*E04H 4/16* (2006.01)
*B08B 9/093* (2006.01)

(52) U.S. Cl.
CPC ............ *G05D 1/0011* (2013.01); *B08B 9/093* (2013.01); *E04H 4/1654* (2013.01)

(58) Field of Classification Search
CPC ............ G05D 1/0011; G05D 1/02727; G05D 1/0246; B08B 9/093; E04H 4/1654;
(Continued)

(56) References Cited

U.S. PATENT DOCUMENTS 5,205,174 A 4/1993 Silverman et al.
5,337,434 A 8/1994 Erlich
(Continued)

FOREIGN PATENT DOCUMENTS

EP 99489 2/1984
EP 1122382 8/2001
(Continued)

OTHER PUBLICATIONS

European Patent Application No. 15201404.9, Extended European Search Report, mailed May 4, 2016, 5 pages.
(Continued)

*Primary Examiner* — Shardul Patel
(74) *Attorney, Agent, or Firm* — Kilpatrick Townsend & Stockton LLP; Dean W. Russell

(57) ABSTRACT

The invention concerns a device and a method of remotely controlling a motorized submerged surface cleaning apparatus (1) comprising a body and a drive device, said remote control device comprising a control terminal (15) having a housing, a device (16) for transmitting control signals for the drive device, characterized in that the housing comprises an orientation detector furnishing at least one orientation parameter of the housing, and in that said device comprises a unit for processing orientation parameters, producing a first command for the drive device for an orientation parameter that is within a first interval of values, and a second command for the drive device for an orientation parameter that is within a second predetermined interval of values.

5 Claims, 3 Drawing Sheets

Related U.S. Application Data

(60) Provisional application No. 61/599,557, filed on Feb. 16, 2012.

(58) Field of Classification Search
CPC ....... B64C 11/001; B64C 11/48; B64C 27/20; F15D 1/00; B60R 25/00
USPC .......................... 701/2, 28, 25; 700/245, 23; 318/580–582, 587; 210/96.1, 140; 15/1.7, 319
See application file for complete search history.

(56) References Cited

U.S. PATENT DOCUMENTS

| | | | | |
|---|---|---|---|---|
| 5,454,129 | A * | 10/1995 | Kell | E04H 4/1654 15/1.7 |
| 5,569,371 | A | 10/1996 | Perling | |
| 5,995,884 | A * | 11/1999 | Allen | G05D 1/0225 180/167 |
| 6,017,400 | A * | 1/2000 | Clark | E02F 3/8858 134/21 |
| 7,621,014 | B2 * | 11/2009 | Katz | E04H 4/1654 15/1.7 |
| 7,710,396 | B2 * | 5/2010 | Smith | G06F 3/017 341/20 |
| 2006/0227030 | A1 * | 10/2006 | Clifford | G08C 17/00 341/176 |
| 2007/0028405 | A1 * | 2/2007 | Garti | E04H 4/1654 15/1.7 |
| 2007/0067930 | A1 * | 3/2007 | Garti | E04H 4/1654 15/1.7 |
| 2008/0128343 | A1 * | 6/2008 | Garti | E04H 4/1654 210/167.16 |
| 2008/0231465 | A1 * | 9/2008 | Lee | G08C 17/00 340/13.25 |
| 2009/0057238 | A1 * | 3/2009 | Garti | E04H 4/1654 210/739 |
| 2009/0241052 | A1 * | 9/2009 | Ha | G06F 3/017 715/772 |
| 2010/0171636 | A1 * | 7/2010 | Lee | G08C 23/04 340/12.22 |

FOREIGN PATENT DOCUMENTS

| | | |
|---|---|---|
| WO | 2004019295 | 3/2004 |
| WO | 2004029564 | 4/2004 |

OTHER PUBLICATIONS

U.S. Appl. No. 13/662,708, Final Office Action, mailed Apr. 14, 2014, 17 pages.
U.S. Appl. No. 13/662,708, Amendment and Response to Final Office Action, filed Jun. 6, 2014, 11 pages.
U.S. Appl. No. 13/662,708, Final Office Action, mailed Feb. 12, 2015, 18 pages.
U.S. Appl. No. 13/662,708, Amendment and Response to Final Office Action, filed Jul. 31, 2015, 6 pages.
U.S. Appl. No. 13/662,708, Non Final Office Action, mailed Aug. 21, 2013, 20 pages.
U.S. Appl. No. 13/662,708, Amendment and Response to Non-Final Office Action, filed Dec. 10, 2013, 18 pages.
U.S. Appl. No. 13/662,708, Non-Final Office Action, mailed Aug. 20, 2014, 17 pages.
U.S. Appl. No. 13/662,708, Amendment and Response to Non-Final Office Action, filed Dec. 19, 2014, 17 pages.
U.S. Appl. No. 13/662,708, Notice of Allowance, mailed Sep. 22, 2015, 11 pages.
French Patent Application No. FR1103275, Search Report, mailed Aug. 24, 2012, 6 pages.
International Patent Application No. PCT/FR2012/052437, International Search Report, mailed Feb. 8, 2013, 7 pages.

* cited by examiner

DEVICE FOR THE REMOTE CONTROL OF A MOTORIZED UNDERWATER SURFACE CLEANING APPARATUS AND APPARATUS THUS CONTROLLED

CROSS-REFERENCE TO RELATED APPLICATIONS

This application is a continuation of U.S. patent application Ser. No. 13/662,708 filed on Oct. 29, 2012, which claims the benefit of and priority to French Patent Application No. 11.03275 filed on Oct. 27, 2011, and to U.S. Provisional Patent Application Ser. No. 61/599,557 filed on Feb. 16, 2012, the contents of each of which are incorporated herein by reference.

FIELD OF THE INVENTION

The invention features a remote control system for a motorized cleaning apparatus for underwater surfaces, such as a surface created by the walls of a pool, in particular, a swimming pool. The invention also features such a motorized apparatus including a remote control device.

BACKGROUND OF THE INVENTION

There have been proposals for ways to remotely control a pool cleaner (or pool robot) before, Thus, for example, U.S. Pat. No. 5,569,371 is known, which proposes a joystick remote control, allowing for control of the apparatus' movements. However, these robots are usually only remotely-controlled for recording an area to be cleaned or a predetermined route to be followed during the automatic cleaning stages.

The control devices and the processes implemented by them have not been described. However, the remote control of such an apparatus must be adjusted since the apparatus moves along in the water and therefore responds differently to control commands from a user compared to motors which move along in the air (cars, helicopters, planes, etc.).

Indeed, a submerged apparatus is not as reactive as a vehicle on land and is much less so than a vehicle in the air. Therefore, there is no risk of losing control and very little risk of collision in the case of errors in operation. The apparatus is also less sensitive to slight changes of speed or direction as its movement is usually slower due to the increased viscosity of water.

Furthermore, the apparatus' position is visually controlled by the user. The apparatus often moves along at the bottom of the pool however, and the visibility of the apparatus is therefore likely to be reduced (reflections on the water, considerable depth, raised surfaces under the water that are difficult to make out, cloudy water etc.).

In addition, most remote controls are not designed for use in or around a swimming pool as they have buttons, joysticks and so on, which are moving mechanical components and therefore cause problems in terms of water-tightness for the remote control box.

SUMMARY OF THE INVENTION

The aim of the invention is therefore to overcome these drawbacks.

The invention aims to provide a remote control for an underwater cleaning apparatus which is simple to use thanks to its user-friendly interface.

The invention aims to provide such a device designed for equipment which moves along under the water.

The invention's main aim is to provide a device that is easy to control and specifically allows quick recognition of the apparatus' movements underwater to deliver reliable visual feedback to the user.

The invention also aims to provide a device that is mechanically and electronically simple.

Therefore, the invention features a remote controlled apparatus for a motorized cleaner of underwater surfaces, with said equipment comprising:
  an equipment housing unit,
  a drive device comprising drive and guiding units designed to move and steer the equipment on the submerged surface in at least one direction, for example, lengthwise, and with at least two distinct types of movement,
said remote control:
  consisting of a control terminal which has at least one box,
  which is designed to be able to create and transmit control signals to and from the drive unit via a communication link,
and distinguished by:
  at least one box comprising an orientation detector, built into the box, and designed to send signals for at least one directional parameter for the box.
  In addition, it comprises a processing unit for signals sent by the orientation detector, designed to create the requisite control signals:
    with an initial request from the drive unit for orientation parameters included in the first phase of preset values,
    with a second request from the drive unit, distinct from the first request, for orientation parameters included in the second phase of preset values, separate from the first phase.

Throughout the document, a "movement mode" describes, in the widest sense, all types of movement by the apparatus. Thus, for example, a linear movement at an initial speed is the first movement mode, and any subsequent linear movement under the same control and in the same direction but at a different speed from the first, is the second movement mode. A fortiori, a curved movement is a different movement mode than that relating to a linear movement.

Control and drive units may vary according to the invention. In particular, according to the invention, an apparatus may be fitted with one or more control units (a targeted water jet for example) which are separate from the drive units (wheels for example), or with units fulfilling both functions at the same time, such as wheels, tracks, etc.

A device, according to the invention, can be successfully applied to cleaning equipment including a filtration chamber, housed in the said unit with:
  at least one water inlet in the unit,
  at least one water outlet in the unit,
  hydraulic liquid circulation circuit between each liquid intake and each liquid outlet via a filtering device.

The apparatus benefits from a hollow casing capable of holding the various units required for apparatus operation. The advantage of the hollow casing is its water-tight chambers, which protect components that are sensitive to water when the apparatus is submerged, such as electrical and/or electronic components.

A device, according to the invention, can be successfully applied to an electrically propelled cleaner, that is, the drive device includes electric motors for the control and drive units. However, a device according to the invention is not limited to electrically propelled cleaners but can be applied to other types of equipment, such as hydraulic equipment where a water jet is remotely controlled, for example, in terms of pressure and direction, and/or equipment fitted with ballast, etc.

The remote control device for underwater surface cleaning equipment, according to the invention, proposes simple and natural control and facilitates remote control suitable for an apparatus submerged in a liquid.

A communication link between a remote control device according to the invention and the cleaning equipment drive unit is designed to transmit the control signals created by the control unit to the equipment drive unit. Such a communication link may include several different elements such as: transmitting antenna(e), receiving antenna(e), intermediary electronic device(s), input port(s), output port(s), etc. A communication link, specifically, between a device according to the invention and equipment according to the invention may be wired, wireless or both. A device according to the invention benefits from some or all of these items, in particular, in a control terminal according to the invention, or in a cleaning device according to the invention.

Indeed, the inventor found that it is best to use an orientation detector (that is, for tilting) from the control terminal to make control easier and more user-friendly.

A control terminal according to the invention includes one or more housing(s). It consists of one or more remote controls (or joysticks) each one with a housing and a orientation detector contained within this housing. Such a terminal especially benefits from a single housing.

Direction parameters are data relative to the orientation axis of a housing from where the angle is detected: it may be a case of the angle, the change of angle or of an increase in the angle according to a given axis.

An orientation detector according to the invention provides data relating to at least one orientation parameter. The orientation detector benefits from one or more sensors designed to detect the angle of at least one fixed direction from the housing compared to an assumed fixed axis in the reference tool selected (for example, the local vertical in a terrestrial reference). Such fixed directions may be better selected according to the geometric axes of the housing (length, width, etc.).

All types of orientation sensors may be considered: gyrometer, gyroscope, inclinometer, accelerometer, etc. Thus, the absolute orientation (or attitude) of a control terminal housing may be measured, for example, in relation to the vertical, that is, in relation to the local terrestrial gravity field.

However, these orientation sensors provide very sensitive and precise measurements.

However, controlling a submerged apparatus does not require as much precision as operating a helicopter, for example. This is demonstrated even further since the equipment generally progresses along a surface with its pitch and roll behavior solely dependent on the standard orientation versus the submerged surface that it sits on, and only its speed and yaw orientation may be controlled.

The inventor found, on the contrary, that users want to be able to clearly see the equipment's movements, even in deep or cloudy water. This constraint therefore means that simple, very clear commands must be sent to the equipment: one turning radius to the right, one turning radius to the left, only two operating speeds in a forward direction, etc. to ensure that the user can easily tell that the robot is actually following their instructions.

However, a priori this feature is not compatible with an orientation detector, which supplies data relating to precise and sensitive orientation parameters about the location of a terminal housing.

This is why, for the first time and in line with the invention, the data relating to the orientation parameters supplied by the orientation detector have been simplified by the processing unit. Indeed, the inventor has divided the total distance of the values that could be used by each orientation parameter into a finite number of value intervals and has programmed the processing unit as a result. Thus, a predetermined finite number of intervals correspond with each orientation parameter.

A single control command is sent to the equipment for all values captured by an orientation parameter in the same predetermined interval.

In particular, the distance of the total values which may be used by an orientation parameter is preferably divided into a number less than or equal to six intervals, specifically into a number less than or equal to three intervals.

The terminal values of each predetermined interval for each orientation parameter according to the invention benefit from permanent recording in the non-volatile memory of the processing unit or to locations that the latter has access.

In an apparatus according to the invention, the number of different control commands that can be sent to the equipment is limited and each change in control command results in a change from one movement mode to another giving rise to significant differences before they can be seen by a user via the pool water. The number of different control commands (forwards, reverse, front left, front right, left, right, etc.) that may be handled by the processing unit is preferably less than twenty-four, and is preferably less than or equal to thirteen in particular.

In particular, according to the invention, the processing unit particularly benefits from being designed to create the requisite command signals of a predetermined command from the drive device for at least one orientation parameter included in a preset range of values, the range being a group of separate intervals and the interval group covering all the values that may be used by the said orientation parameter.

Thus, every orientation parameter value must belong within a predetermined range of values, with this range corresponding to a predetermined control command. The processing unit therefore compares the value for each orientation parameter to values that make up the interval terminals relating to this orientation parameter so as to create a command signal which corresponds to the intervals in which the orientation parameter can be found at a given moment.

The processing unit uses surjection to handle each orientation parameter. Indeed, a single command is created by several separate values of an orientation parameter contained within a given predetermined value interval.

In particular, the number of value intervals for a given orientation parameter is preferably less than ten, and specifically less than or equal to five.

In addition, the value intervals for a given orientation parameter (for example, the pitch of the control terminal) may be dependent on the value taken by one or several other orientation parameters (for example, the roll of the control terminal).

According to the invention, an initial orientation parameter for the said box successfully measures the pitch of the box.

Moreover, according to the invention, the processing unit benefits from its design capability for creating the requisite command signals:
- for an initial command relating to moving the equipment firstly in a lengthwise direction to measure the pitch of the housing contained in an initial predetermined interval of values,
- for a second command relating to stopping the equipment to measure the pitch of the housing contained in a second predetermined interval of values, different from the first interval,
- for a third command relating to moving the equipment in a second direction, opposite to the first, but still lengthwise to measure the pitch of the housing contained in a third predetermined interval of values, different from the first and second interval.

In particular, and according to the invention, the distance for the housing pitch values is preferably divided into five intervals with each corresponding to a different control command from the drive unit. Specifically, and according to the invention, these five intervals successfully correspond to the following commands:
- an initial speed and a subsequent speed, different from the former, in an initial direction lengthwise, for example, moving forwards,
- an initial speed and a subsequent speed, different from the former, in a second direction lengthwise, but different from the initial direction lengthwise, for example, moving in reverse,
- stopping the equipment.

A terminal box according to the invention benefits from a top and bottom side, which a user can tell apart so he is able to easily identify how to turn the box—by pitching—in order to control the apparatus' movements forwards or backwards in a lengthwise direction. Measuring the pitch angle is the equivalent of measuring a rotation angle about a transverse axis of the box (from left to right).

Thus, by dividing the distance for the box pitch values (tilting from front to back or from back to front) into five, it is possible to achieve five separate drive commands for the apparatus depending on the pitch of the said box.

Examples include:
- a very slight tilt in relation to a fixed direction of the reference tool (for example, the vertical given by the acceleration of gravity) may result in the apparatus coming to a stop on the underwater surface,
- a moderate tilt forwards may result in a command to move forwards at low speed,
- a sharp tilt forwards may result in a command to move forwards at high speed,
- a moderate tilt backwards may result in a command to move backwards at low speed,
- a sharp tilt backwards may result in a command to move backwards at high speed, Thus, the drive command instructions for the apparatus can easily be developed to set the pitch orientation parameters for a remote control box.

In addition, according to the invention, a second orientation parameter for the said box successfully measures the roll of the box.

According to the invention, the processing unit benefits from its design capability for creating the requisite command signals:
- an initial command relating to guiding the equipment firstly turning in a yaw movement, to measure the roll of the said box contained in an initial predetermined interval of values,
- a second command relating to guiding the equipment straight ahead in a lengthwise direction, without turning in a yaw movement, to measure the roll of the said box contained in a second predetermined interval of values, different from the initial interval,
- a third command relating to guiding the equipment in a second direction, turning in a yaw movement, opposite to the first turn movement to measure the roll of the said box contained in a third predetermined interval of values, different from the first and second interval.

In particular, and according to the invention, the distance for the box roll values is preferably divided into five intervals with each corresponding to a different guiding command from the drive unit. In particular, and according to the invention, these five intervals successfully correspond to the following commands:
- an initial turning circle (or turning radius) and a second turning circle separate from the first turning circle with an initial direction, turning in a yaw movement, for example, to the left,
- an initial turning circle (or turning radius) and a second turning circle separate from the first turning circle with a second direction, turning in a yaw movement, for example, to the right,
- guiding the equipment in a linear movement.

An initial turning circle is achieved, for example, by moving forwards or backwards while at the same time guiding with a moderate rotation. A second turning circle is achieved, for example, by rotating on the spot.

A terminal box according to the invention benefits from a left and right side, which a user can easily identify, so he is able to easily work out how to turn the box—by rolling—in order to control the apparatus in a yaw movement to the left or to the right. Measuring the roll tilt is the equivalent of measuring a rotation angle around a longitudinal axis of the box (from back to front).

Thus, by dividing the area for the box roll values (tilting from left to right or from right to left) into five, it is possible to achieve five separate guiding commands for the apparatus, subject to the roll angle of the said box.

Examples include:
- a very slight tilt in relation to a fixed direction of the reference tool (for example, the vertical given by the acceleration of gravity) may result in the equipment being steered in a straight line on the underwater surface,
- a moderate tilt to the right may result in a command for a long turning circle to the right,
- a sharp tilt to the right may result in a command for a short turning circle to the right, notably rotating on the spot,
- a moderate tilt to the left may result in a command for a long turning circle to the left,
- a sharp tilt to the left may result in a command for a short turning circle to the left, notably rotating on the spot.

Thus, the yaw movement instructions for the apparatus can easily be developed to set the roll orientation parameters for a remote control box.

The total of the values that may be used by each of the pitch and roll orientation parameters is 360 degrees: 180° on each side (front, back, left and right) of a fixed axis from the reference tool, for example, the vertical for an axis of the remote control box which is vertical at rest. These two areas with values of 360° may each be divided into five intervals. Each interval of one of the two areas corresponds to one drive command from the drive device and each interval of the second area of the two areas corresponds to a guiding command from the drive device:

| Interval | Drive command to measure pitch | Guiding command to measure roll |
| --- | --- | --- |
| [−180°, −90°[ | Rapid reverse | Turning on the spot to the left |
| [−90°, −30°[ | Slow reverse | Moderate turn to the left |
| [−30°, +30°[ | Stopping | Straight ahead |
| [+30°, +90°[ | Slow advance | Moderate turn to the right |
| [+90°, +180°[ | Rapid advance | Turning on the spot to the right |

Throughout the document, angles are calculated as positives when the box is tilted forwards to measure pitch and to the right to measure roll. They are counted as negatives respectively when tilted backwards for pitch and to the left for roll.

Two adjacent intervals are kept separate, that is, they do not share any common value. The total of the values that may be used by an orientation parameter is included in the total of the said intervals. The value limit between two adjacent intervals is included in one of the two adjacent intervals (closed terminal), but is not included in the second of the two adjacent intervals (open terminal).

The processing unit is able to create the requisite command signals by combining a drive command and a guiding command, in other words: for a pitch angle of 20° and a roll angle of −45°, the processing unit creates the requisite command signals for the "slow advance with moderate turn to the left" command.

Furthermore, one of the two orientation parameters may be dependent on the value from the other orientation parameter. Thus, for example, whatever the value of the pitch orientation parameter, for a roll orientation parameter contained within [−180°, −90°[ or [+90°, +180°[, a command to turn on the spot is sent without any drive command (when the apparatus features drive and guiding units which facilitate turning on the spot, specifically rotation on the spot without simultaneous movement being required).

In general, most types of underwater cleaning apparatus in the industry do not need to make the distinction between drive commands and guiding commands, particularly when the same units perform both functions at the same time. This is the case, for example, when the drive units are wheels, as a certain number of them at least can be controlled in a yaw movement. In this case, the command signals created by the processing unit represent a specific command for driving and guiding the apparatus. This is even more the case when the apparatus has wheels which cannot pivot, but still ensures both propulsion and guiding of the apparatus, specifically by regulating the rotation speed of the wheels located on one side. For example, the wheels located on the left side may move in the same direction as the wheels on the right side but at a different speed, allowing movement and rotation of the apparatus to occur in accordance with a non-zero turning radius. In the same way, by rotating the wheels on the left side in a counter direction to the wheels on the right side, turning on the spot occurs in accordance with a zero turning radius.

For five intervals of values for each of the two orientation parameters, the processing unit is thus able to create twenty-five types of distinct commands (each of which represents a specific movement mode combining drive movement and guiding). It is preferable to only create thirteen types of distinct commands: each reverse and forward speed may be linear or have a moderate rotation to the left or right; each command for turning on the spot is separate from the pitch orientation parameter value, and a single stopping command.

Furthermore, according to the invention, the orientation detector benefits from an accelerometric device.

According to the invention, the accelerometric device benefits from a triple-axis accelerometer.

Such accelerometers are standard in the industry and are not expensive. Moreover, they facilitate capturing measurements on one, two or three axes of orientation for the box.

The accelerometric device is in fact successfully used as an inclinometer allowing each attitude axis (pitch and roll specifically) for the remote control to be measured in relation to the gravity field of the Earth. The accelerometric device is specifically designed to supply the measurements of at least two components of the Earth's gravity acceleration according to the two attitude axes of the box.

Moreover, according to the invention, each box has the benefit of being water-tight. With such a box being designed to be used near to or in a pool, the water-tight casing ensures both the integrity of the electronic elements of the control terminal, and prevents any risk of electric shock for the user.

In particular, the box has the advantage of no buttons, so it does not contain any moving mechanical parts, which makes it even more water-tight.

Its water-tightness is thus easily ensured and its use in a swimming pool can be anticipated.

Additionally, according to the invention, if the casing is immersed in water, it is designed to float to the surface.

Recovering such a remote control that has fallen into the water, particularly in a swimming pool, is therefore easier.

In particular, the volume of the remote control and the material of its housing can be chosen so that it can float.

Advantageously and according to the invention, each housing comprising an orientation detector is also equipped with:
  a processing unit,
  a wireless transmitter connected to the processing unit and capable of wirelessly transmitting control signals produced by the processing unit.

Thus, a control terminal according to the invention comprises at least a housing equipped with an orientation detector, a unit for processing signals furnished by the orientation detector capable of producing control signals for the apparatus' drive device from signals furnished by the orientation detector, and a wireless transmitter to wirelessly transmit the control signals produced by the processing unit. Each housing is therefore a wireless remote control.

A wireless transmitter can use technologies such as radio frequencies (Bluetooth®, Wi-Fi, etc.), infrared, etc. In particular, there is nothing to prevent the use, as a remote control, of a mobile telephone or a computer equipped with an orientation detector and a wireless transmitter, on which a computer program has been installed in order to allow the control signals according to the invention to be produced from the signals furnished by its own orientation detector, then the transmission of said signals by one of its wireless communication means.

A device according to the invention further advantageously comprises an intermediate relay comprising an antenna for receiving control signals transmitted by said wireless transmitter, and connected to the cleaning apparatus by a cable that is capable of:
  being at least partially submerged,
  transmitting control signals.

The intermediate relay provides a link between wireless control signals outside of the pool, and wired control signals in the pool. Indeed, the transmission of most wireless signals in water is weak. This is the reason the apparatus is advantageously connected to the intermediate relay by a cable.

Said cable can contain at least one wire dedicated to the transmission of control signals. Alternatively, if the cable includes two wires for supplying electric power to the apparatus, the control signals can be transmitted by carrier current on said power supply wires.

Such an intermediate relay can advantageously be disposed on one edge of the pool or it can be floating. A floating intermediate relay is advantageously connected by a cable to the body of the apparatus. In particular, a floating intermediate relay is pulled by the apparatus and therefore moves on the surface of the water when the apparatus moves in the pool. Said intermediate relay can be self powered and can even supply the energy to the cleaning apparatus, for example, by being equipped with photovoltaic panels.

Advantageously and according to the invention, the cleaning apparatus further comprises an electronic control unit capable of:

controlling the drive device according to at least one cleaning program recorded in a memory, upon reception of control signals, suppressing a cleaning program in progress in order to control the drive device according to said control signals.

The electronic control unit of the cleaning apparatus is advantageously on board the apparatus, in the body thereof, but can also be in the intermediate relay, the only link between the intermediate relay and the cleaning apparatus then advantageously being an electric power link controlled from the intermediate relay the electronic control unit.

As an advantageous variation, when the control terminal is connected directly by wire to the apparatus, the processing unit can be connected to the drive device so as to directly control the power, with no electronic control unit or intermediate relay interposed between them.

The invention also concerns a remote control device characterized in combination by all or part of the characteristics mentioned above or below.

The invention also extends to a method implemented by a remote control device according to the invention.

The invention further extends to a computer program comprising computer code instructions for executing said method when it is loaded and executed on a computerized control terminal such as a mobile telephone or a computer.

The invention also extends to a motorized submerged surface cleaning apparatus comprising:

a body, a drive device comprising guide and drive systems capable of driving and guiding the body on the submerged surface in at least one direction, called lengthwise direction, and in at least two distinct modes of movement, a remote control device according to the invention, a communication link between said remote control device and said drive device capable of allowing at least the transmission of control signals between the remote control device and the drive device.

Advantageously, an apparatus according to the invention is an electric apparatus, that is, the drive device of which comprises electric motors for driving the drive and guide systems of the apparatus. Thus, advantageously and according to the invention, the electronic control unit on board the apparatus or in the intermediate relay controls the power of the electric motors.

The invention also concerns a motorized submerged surface cleaning apparatus characterized in combination by all or part of the characteristics mentioned above or below.

BRIEF DESCRIPTION OF THE DRAWINGS

Other purposes, characteristics and advantages of the invention will be seen from the following non-limiting description, with reference to the appended figures in which.

DETAILED DESCRIPTION

Figure 1:
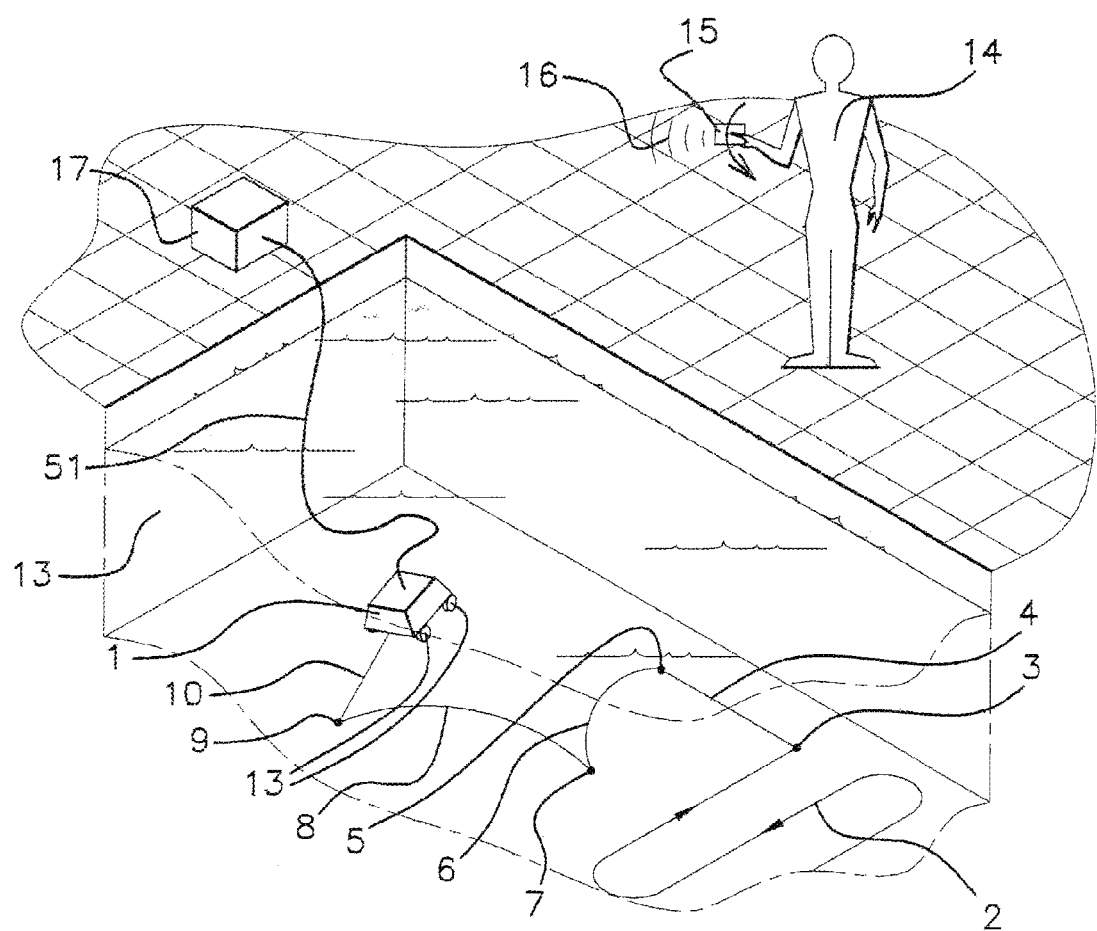
FIG. 1 is a diagrammatic representation of a remote control device according to one embodiment of the invention, implemented by a user to remotely control a cleaning apparatus according to the invention.
Figure 2:
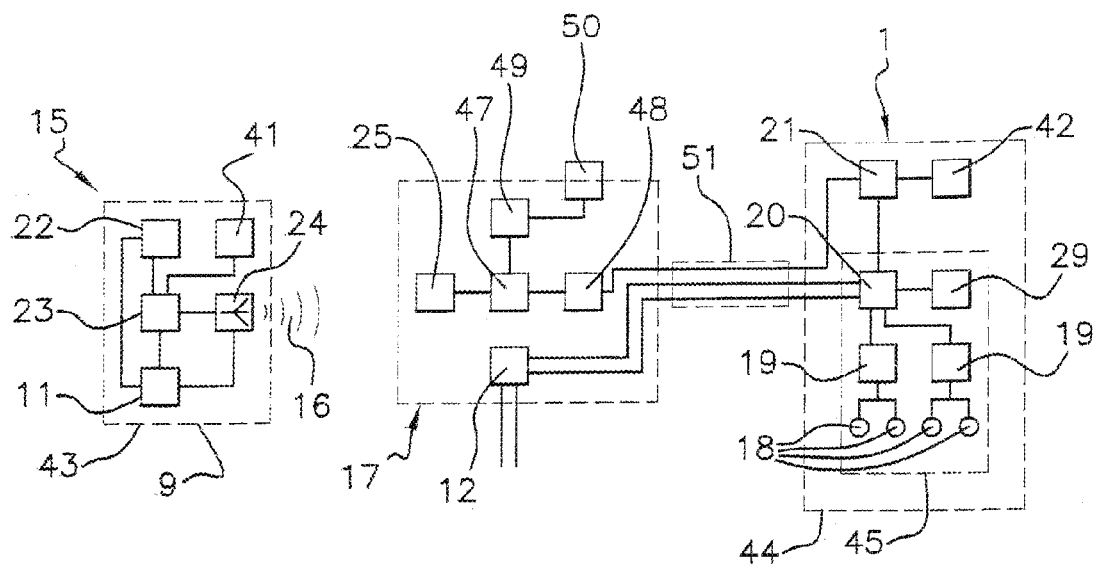
FIG. 2 is a functional block diagram of the embodiment of the device of FIG. 1.

A remote control device according to the invention for an apparatus 1 according to the invention advantageously comprises a control terminal in the form of a self-powered remote control 15, comprising for that purpose a battery 11 that can be rechargeable or interchangeable.

The remote control device according to the invention also comprises a transmission device capable of establishing a communication link between the control terminal and the drive device of the apparatus. The transmission device includes a wireless transmitter 24 in said remote control, an intermediate relay 17 installed on the edge of a swimming pool 13 and connected by a cable 51 to the cleaning apparatus 1, submerged in the pool.

Thus, the remote control 15 transmits, by its wireless transmitter 24, radio frequency control signals 16.

The control signals 16 are produced by a processing unit 23 of the remote control, from signals issued by an orientation detector 22.

The orientation detector 22 comprises three accelerometric sensors according to three orthogonal directions. Each accelerometric sensor is a capacitive type sensor chosen for its low cost of production. However, other types of orientation sensors, particularly accelerometric sensors, can be chosen within the scope of the invention.

The orientation detector 22 furnishes measurements of tilt of the housing 43, particularly with respect to the local gravity field. It thus serves as an inclinometer.

The processing unit 23 processes the signals furnished by the orientation detector 22 along two axes of the housing 43 of the remote control 15: one pitch axis 26 (tilting forwards or backwards) and a roll axis 27 (tilting towards the right or towards the left).

When the remote control is within range of the intermediate relay 17, the wireless control signals 16 that it transmits are received by a receiving antenna 25 of the intermediate relay 17. The signals received by the receiving antenna 25 are processed by a microprocessor 47, which produces control signals for the electronic control unit 21 of the apparatus, which control signals are transmitted via the communication interface 48 via the cable 51 connected to the body 44 of the apparatus.

The intermediate relay 17 also comprises a man/machine interface 50 and an electronic management unit 49 for this interface interposed between said interface 50 and the microprocessor 47.

The intermediate relay further comprises an electric power supply 12 capable of being connected to an electricity grid. This power supply 12 supplies the different electrical/electronic elements of the intermediate relay 17 at an appropriate voltage, and also supplies the cleaning apparatus by the cable 51 at an appropriate voltage.

The cable 51 therefore has at least two wires for supplying electric energy, and one bidirectional transmission wire for control signals.

Upon reception of the control signals, the apparatus implements the commands that said control signals represent. The control signals 16 are control signals of a drive device 45 on board a cleaning apparatus according to the invention. The drive device 45 comprises at least one power converter 20 connected to the input of the electronic control unit 21.

The electronic control unit 21 sends to the power converter 20 power signals that are produced from control signals it receives via the cable 51 linking to the intermediate relay 17 when it receives them, and otherwise from a program stored in an on-board memory 42 when there are no control signals from the remote control. The output of the power converter 20 is connected to the drive motors 19 in such a way as to furnish electric supply power corresponding to the power signals received from the electronic control unit 21.

The apparatus 1 according to the embodiment shown in FIG. 1 is an apparatus with electricity supplied by the cable 51 linking to the intermediate relay 17 which is electrically connected to the power grid.

The apparatus 1 comprises at least two axle shafts substantially parallel to each other, each provided with at least one drive wheel laterally offset from a first side of the body 44 of the apparatus 1 and at least one drive wheel offset from a second side of the body laterally opposite to the first side of the body. The apparatus therefore comprises four electrically motorized wheels 18 that are distributed two by two on each side of the body of the apparatus.

Each set of wheels situated laterally on the same side of the body 44 of the apparatus is driven by a single electric motor 19 so that the direction of rotation and speed of rotation can be independently controlled for each set of wheels. Thus, a variation in direction and speed of rotation of each set of wheels 18 makes it possible to drive and guide the apparatus on the submerged surfaces of the pool.

In particular, a command in the contra-rotating direction of the wheels situated on the first side (left, for example) of the apparatus and of the wheels situated on the second side (respectively, the right side) of the apparatus makes it possible for the apparatus to rotate in place. The control of all of the wheels 18 in the same direction at different speeds to the right and to the left makes it possible to turn the apparatus during movement at a non-zero turning radius. A preferential lengthwise drive direction of the apparatus corresponds to a rotation of four wheels in the same direction and at the same speed, the four wheels being in contact with the submerged surface.

A device according to the invention makes it possible to manually control an apparatus according to the invention A user 14 can see the apparatus 1 at the bottom of the swimming pool 13, so as to have a visual feedback of the control he is performing on the apparatus.

Advantageously, the control of the apparatus is instinctive by tilting the remote control 15 forwards in order to control the apparatus in a forwards direction, tilting the remote control backwards in order to control the apparatus in a backwards direction, tilting the remote control towards the left in order to rotate the apparatus towards the left, and tilting the remote control towards the right in order to rotate the apparatus towards the right.

The remote control 15 can be oriented in any direction, offering a large number of combinations of position of the pitch axis 26 and roll axis 27 of the remote control, but the number of commands of the apparatus is reduced. The number of different commands in the device represented in FIGS. 1 to 5 is thirteen.

Figure 4:
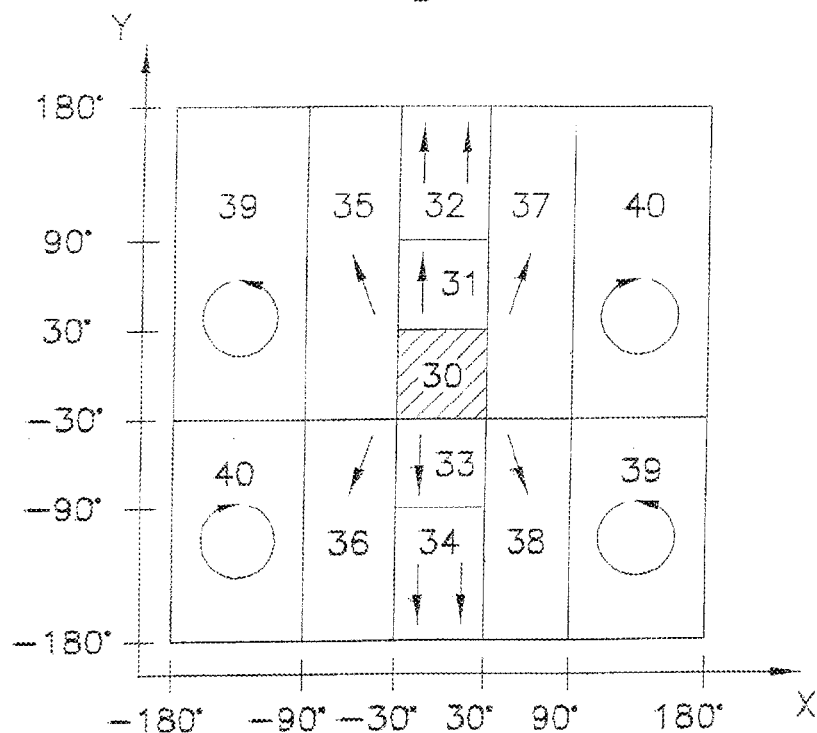
FIG. 4 is a simplified two-dimensional diagrammatic representation of the value intervals and of the corresponding controls in a remote control device and method according to the invention.

Thus, in FIG. 4, the thirteen commands are represented as orientation parameters that are the pitch measurements on the Y axis and roll measurements on the X axis of the angles of the remote control.

Thus, for a very steep roll angle to the left or right, i.e. between −180° and −90° or respectively between 90° and 180°, the processing unit 23 produces a command depending on both the roll value and pitch value of the remote control. If the remote control is substantially vertical or tilted forwards (pitch angle between −30° and 180°), a command respectively to rotate in place in the counterclockwise direction 39 (for an observer observing the cleaning apparatus from above) or a command in the clockwise direction 40 is produced. If the remote control is tilted backwards (pitch angle between −30° and −180°), a command respectively to rotate in place in the clockwise direction 40 or a command in the counterclockwise direction 39 is produced.

Thus, for a moderate roll angle to the left or right, i.e. between −90° and −30° or between 30° and 90°, the processing unit 23 produces a command depending on both the roll value and pitch value of the remote control. If the remote control is substantially vertical or tilted forwards (pitch angle between −30° and 180°), a command respectively to move forward with rotation to the left 35 or a command to move forward with rotation to the right 37 is produced. If the remote control is tilted backwards (pitch angle between −30° and −180°), a command respectively to move backwards with rotation to the left 36 or a command to move backwards with rotation to the right 38 is produced. There is advantageously only one speed of backwards movement with rotation.

The commands in the clockwise 40 and counterclockwise 39 directions for steep roll angles of the remote control are thus distributed so that there is a certain continuity of movement between each command for forward/backward movement with rotation to the left/right, and the rotations in place in the clockwise/counterclockwise directions.

For a low roll angle to the left or to the right, i.e. between −30° and 30°, the processing unit 23 ignores the roll angle and only considers the pitch angle of the remote control. Thus, for a steep backward pitch angle (between −180° and −90°), the processing unit 23 produces a command for fast backward movement 34. For a moderate backward pitch angle (between −90° and −30°), the processing unit 23 produces a command for slow backward movement 33.

Similarly, for a moderate forward pitch angle (between 30° and 90°), the processing unit 23 produces a command for slow forward movement 31. And for a strong forward pitch angle (between 90° and 180°), the processing unit 23 produces a command for fast forward movement 32.

Finally, for any roll and/or pitch angle of less than an absolute value of 30°, the processing unit 23 produces a stop command 30 of the apparatus 1.

Figure 3:
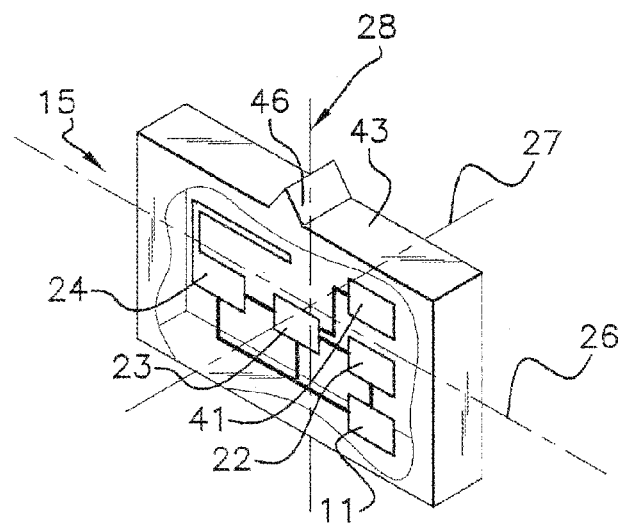
FIG. 3 is a diagrammatic representation of a control terminal according to the invention, the front face of which is represented torn away to reveal its essential components.

In a remote control according to the invention as represented in FIG. 3, the accelerometric device (orientation detector 22) is disposed offset according to a vertical axis 28 of the remote control, with respect to the centers of rotation of the pitch 26 and roll 27 axes of the remote control. All of the positions measured by such a device during the roll and pitch angles of the remote control are therefore represented by a sphere.

Thus, the tilt and roll angle values are represented in the space by standard three-dimensional vectors.

Figure 5:
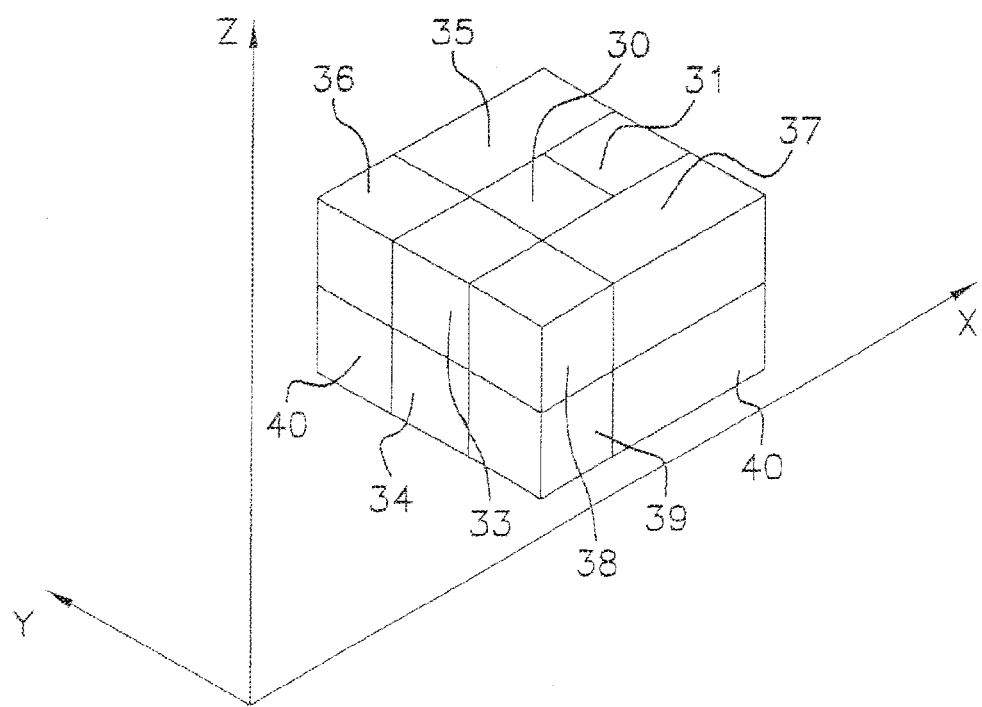
FIG. 5 is a three-dimensional diagrammatic representation of the value intervals and of the corresponding controls in a remote control device and method according to the invention.

In FIG. 5, a breakdown of the space occupied by the sphere is represented, which corresponds to the two-dimensional breakdown represented in FIG. 4. Each portion of the sphere falls within a parallelepiped, and each parallelepiped corresponds to a single control command of the apparatus. Thus, for all roll and pitch angle values of a portion of sphere included within the same parallelepiped, the same control command of the apparatus is produced by the processing unit 23.

In order to produce appropriate control signals, the processing unit 23 of the remote control 15 carries out successive comparisons of the three values of a vector represented in the three-dimensional space X, Y, and Z, with respect to threshold values corresponding to the limits represented in FIG. 5 between each parallelepiped corresponding to the same command. The processing unit 23 implements a method called state machine making it possible to determine a command corresponding to a vector furnished by the orientation detector 22, and enabling the detection of impossible transitions from one command to another or of erroneous signals from the orientation detector 22. In particular, a chronometer is triggered with each command change, and until a predetermined period of time—for example, of the order of 0.1 second of filter time—has passed, a second command change cannot be made, thus limiting contradictory commands sent to the electronic control unit 21 due, for example, to a user whose hand is trembling, or to a remote control tilted at a limit angle (for example, with a roll of approximately) 30°).

The values of the predetermined interval limits are advantageously recorded in a read-only memory 41 during factory programming just after manufacture or assembly of the remote control.

Moreover, representative data of automatic cleaning programs are advantageously recorded in a memory 42 on board the apparatus—particularly in the body 44 of the apparatus—so as to enable an electronic control unit 21 of the apparatus to implement such a cleaning program in the absence of control by a user 14.

The electronic control unit 21 in particular is capable of suppressing any automatic cleaning program in progress when remote control signals are received.

The electronic control unit 21 is connected to the power converter 20 of the drive device 45. It produces and furnishes power commands to this power converter 20 as a function of an automatic program or control command.

The power converter 20 delivers electric power to the motors 19 of the drive device 45. The power converter is capable of delivering independent electric power to each motor 19 driving two lateral wheels 18 situated on the same side of the body 44 of the apparatus. In particular, such a converter can furnish independent power to each motor 19.

Furthermore, the power converter 20 delivers electric power upon commands from the electronic control unit 21 to the motor of a pumping device 29 on board the body 44 of the cleaning apparatus. The pumping device 29 enables a circulation of water through a filter chamber interposed in a hydraulic liquid circulation circuit between a liquid intake inside the body and a liquid outlet outside the body. The power from this pumping device 29 is advantageously used as supplemental propulsion of the drive device, particularly thanks to a liquid outlet advantageously oriented open toward the rear of the apparatus—said liquid outlet can be chosen as orientable and controlled by the electronic control unit 21.

To implement a command to rotate in place, the wheels located on the left of the body of the apparatus are driven at the same speed and in contra-rotating direction with respect to the wheels located on the right of the apparatus. Similarly, to implement a command to move forward with rotation to the right, for example, the four wheels are driven in the same direction but the two wheels on the right of the body are driven at a speed lower than the drive speed of the wheels located on the left of the body.

The remote control according to the invention enables a simple, intuitive command of a motorized submerged surface cleaner. The remote control according to the invention also enables a great diversity of trajectories of the apparatus in spite of the limited number of commands.

Thus, in FIG. 1, the apparatus is running an automatic cleaning program according to a first portion 2 of trajectory when it receives, at point 3, manual control signals 16 by a user 14.

At point 3, it receives a command 39 to rotate in place 90° to the left, then it receives a command 31 to move forward at slow speed up to point 5, along a second portion 4 of the trajectory.

Starting at point 5, the user holds the remote control forward and moderately tilted towards the left, so that the apparatus receives a command 35 to move forward with rotation to the left along the third portion 6 of the trajectory.

At point 7, the user has tilted the remote control backwards and towards the right, so that the apparatus receives a command 38 to move backwards with rotation to the right, to follow a fourth portion 8 of the trajectory.

At point 9, the user has increased the angle of the remote control to the right, so that the processing unit has ignored the pitch angle and has sent command signals that are representative of a command 40 to rotate in place 315° to the right.

The user then tilts the remote control sharply forward, so that the apparatus receives a command to move forward quickly along a fifth portion 10 of a linear trajectory.

Furthermore, the housing 43 of the remote control 15 is advantageously water-tight. The remote control housing 43 is also advantageously flat between a front face and a rear face, and has a different width and height. Thus, a user quickly recognizes the shape of the remote control and knows the resting position corresponding to a command to stop the apparatus. Markings can also distinguish the front face from the rear face and the normal direction (up/down, left/right) of use of the remote control. In particular, in the particular embodiment represented in FIG. 3, the remote control has a failsafe device 46 making it possible to quickly distinguish the top from the bottom of the remote control, and thus the orientation at rest of the remote control.

The remote control is advantageously easy to maneuver by a user and has dimensions of about 120 mm×80 mm×20 mm and a weight of about 130 grams.

Furthermore, the remote control 15 floats, so that a user can use it while in the swimming pool or on the edge of the pool, and can recover it easily if it falls into the water.

The invention can have numerous other variations of embodiment not represented.

There is nothing to prevent using a single accelerometric device having only one or two accelerometers to measure the orientation of one or two axes of the attitude of the remote control. For example, a very simple remote control with only one axis of attitude allows the apparatus to be controlled in forward motion and backward motion. In this case, an automatic turn in a yaw movement can be provided (electronically or mechanically) in a predetermined direction during backward motion, in order to be able to reorient the apparatus.

For purposes of simplification, only the essential elements of the invention have been represented diagrammatically. However, numerous other elements, in particular, electronic elements in FIGS. 2 and 3, can be added to the remote control, to the intermediate relay and to the cleaning apparatus.

The invention claimed is:

1. A method of controlling a swimming pool cleaner, comprising:
   a. establishing a wired connection between the swimming pool cleaner and an intermediate relay external to a swimming pool in which the swimming pool cleaner operates;
   b. causing the swimming pool cleaner to execute within the swimming pool an automatic cleaning program recorded in a memory of either the intermediate relay or the swimming pool cleaner;
   c. grasping a transmitting device (i) distinct from the intermediate relay, (ii) external to the swimming pool, (iii) comprising a housing, and (iv) including within the housing an accelerometric device (A) disposed offset according to a vertical axis of the housing with respect to centers of rotation of pitch and roll axes of the housing and (B) configured to measure orientation of the housing relative to a local terrestrial gravity field;
   d. orienting the housing in a first position, thereby causing the transmitting device to transmit wirelessly a first control signal to the intermediate relay so as to (i) suppress execution of the automatic cleaning program and (ii) control the swimming pool cleaner in a first manner; and
   e. orienting the housing in a second position different from the first position, thereby causing the transmitting device to transmit wirelessly a second control signal, differing from the first control signal, to the intermediate relay so as to (i) suppress execution of the automatic cleaning program and (ii) control the swimming pool cleaner in a second manner different from the first manner.

2. The method according to claim 1 in which (a) the housing further includes a processing unit and (b) the act of orienting the housing in a first position causes the processing unit to compare orientation values of the first position to internal values stored in a memory of the processing unit before wirelessly transmitting the first control signal.

3. The method according to claim 2 in which the act of orienting the housing in a second position causes the processing unit to compare orientation values of the second position to interval values stored in a memory of the processing unit before wirelessly transmitting the second control signal.

4. The method according to claim 1 in which the act of grasping a transmitting device comprises grasping a waterproof transmitting device.

5. The method according to claim 1 in which the act of grasping a transmitting device comprises grasping a buoyant transmitting device.

* * * * *